United States Patent
Fleury et al.

(10) Patent No.: US 12,139,663 B2
(45) Date of Patent: Nov. 12, 2024

(54) METHOD FOR TREATING A SUBTERRANEAN FORMATION BY INJECTING AN AQUEOUS GELLING SOLUTION COMPRISING AN ALUMINATE

(71) Applicant: IFP Energies nouvelles, Rueil-Malmaison (FR)

(72) Inventors: Marc Fleury, Rueil-Malmaison (FR); Olivier Sissmann, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 184 days.

(21) Appl. No.: 17/921,262

(22) PCT Filed: Mar. 31, 2021

(86) PCT No.: PCT/EP2021/058434
§ 371 (c)(1),
(2) Date: Oct. 25, 2022

(87) PCT Pub. No.: WO2021/219318
PCT Pub. Date: Nov. 4, 2021

(65) Prior Publication Data
US 2023/0174847 A1    Jun. 8, 2023

(30) Foreign Application Priority Data
Apr. 28, 2020  (FR) ...................... 2004214

(51) Int. Cl.
*C09K 8/46* (2006.01)
*C09K 8/42* (2006.01)
*C09K 8/575* (2006.01)

(52) U.S. Cl.
CPC .............. *C09K 8/575* (2013.01); *C09K 8/426* (2013.01); *C09K 8/46* (2013.01)

(58) Field of Classification Search
CPC .......... C09K 8/575; C09K 8/426; C09K 8/46; C09K 8/506; C09K 8/572; C09K 8/5045; C04B 28/26
See application file for complete search history.

(56) References Cited

U.S. PATENT DOCUMENTS 3,493,406 A    2/1970  Fillet et al.
2020/0325382 A1*  10/2020  Sissmann ............... C09K 8/426

FOREIGN PATENT DOCUMENTS

| EP | 0155859 A1 | 9/1985 | |
| EP | 0597735 A1 | 5/1994 | |
| FR | 3049642 A1 | 10/2017 | |
| WO | 2013/165717 A1 | 11/2013 | |
| WO | WO-2017174243 A1 * | 10/2017 | ............. C04B 28/26 |
| WO | 2019/222095 A1 | 11/2019 | |

* cited by examiner

*Primary Examiner* — Kumar R Bhushan
(74) *Attorney, Agent, or Firm* — FITCH, EVEN, TABIN & FLANNERY, LLP

(57) ABSTRACT

A method for sealing and/or consolidating a subterranean formation, the subterranean formation being traversed by at least one injection well, includes the steps of preparing a gelling aqueous solution comprising an alkaline solution of potassium silicate, acetic acid and an aluminate, and injecting from the injection well, into the subterranean formation, the gelling aqueous solution to seal and/or to consolidate the subterranean formation.

20 Claims, 1 Drawing Sheet

[Fig 1]
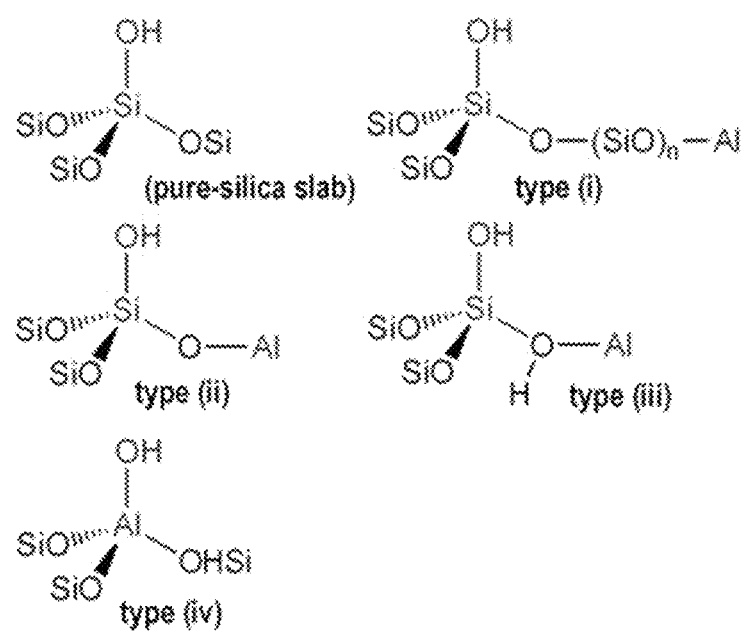
[Fig 2]
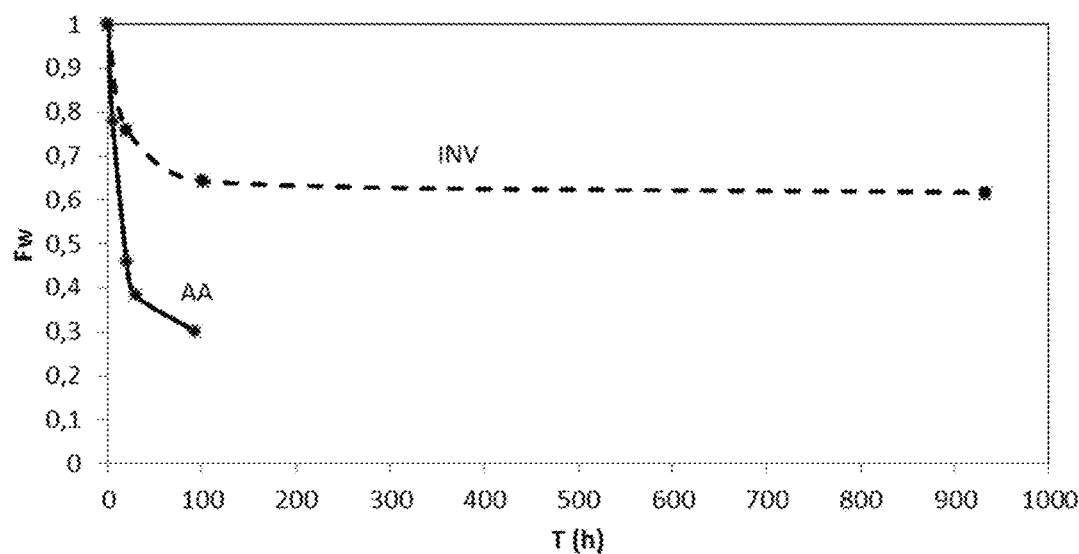

METHOD FOR TREATING A SUBTERRANEAN FORMATION BY INJECTING AN AQUEOUS GELLING SOLUTION COMPRISING AN ALUMINATE

CROSS-REFERENCE TO RELATED APPLICATIONS

This application is a U.S. national phase application filed under 35 U.S.C. § 371 of International Application No. PCT/EP2021/058434, filed Mar. 31, 2021, designating the United States, which claims priority from French Application No. 2004214, filed Apr. 28, 2020, which are incorporated herein by reference in their entireties.

FIELD OF THE INVENTION

The present invention relates to the field of treating a subterranean formation in order to seal and/or to consolidate the subterranean formation and/or to plug a well, in particular in the field of geological storage of acid gas, carbon dioxide $CO_2$ for example. Subterranean formation "sealing" is a method for reducing the permeability of at least part of the subterranean formation, notably with respect to a given fluid, oil or water for example. Subterranean formation "consolidation" is a method for improving the mechanical properties of the subterranean formation. It is noted that these two applications can be achieved with a single method. Well "plugging" is a method for filling the cracks present in the material, cement for example, forming the well.

In various fields of use of subterranean formations, it is often useful to seal and/or to consolidate the subterranean formation and/or to plug a well in order to promote its subsequent use, for geological storage of acid gas for example. Fragile or clay soils for example need consolidation to overcome clay swelling or shrinkage phenomena. According to another example, water movement in soils often requires sealing so as to create a preferential path for a fluid by reducing the permeability of adjacent zones to this fluid (the fluid can be water or oil for example).

BACKGROUND OF THE INVENTION

Several methods have been developed for sealing and/or consolidating subterranean formations.

For example, patent application EP-0597735 describes the preparation of a grout (i.e. a fluid mortar that can flow in cavities, such a grout comprises solid particles) for sealing and/or consolidating soils and construction materials. The viscosity of such a grout is not suitable for injection into an injection well for deep treatment of a subterranean formation.

Furthermore, patent application WO-2010/0107219 A1 describes a method of treating the vicinity of acid gas storage wells. For this method, a washing fluid is first injected into the rock, then a reactive solution suited to react with acid gas, this reactive solution comprising basic oxides. However, this method proposes using materials that can be expensive, which can pollute the subterranean formation and may require a specific preparation notably for viscosity adjustment.

Besides, patent application FR-3,049,642 (WO-2017/174,243) also describes a method of treating the vicinity of wells, comprising preparing, then injecting into a subterranean formation a gelling aqueous solution containing an alkaline solution of potassium silicate and acetic acid. This gelling aqueous solution allows, by means of these gelling properties, to plug the well vicinity, while being inexpensive and causing limited pollution. However, this gelling aqueous solution can, under certain conditions, be subjected to syneresis mechanisms after the acetic acid-induced gelation. This mechanism is an evolution of the chemical bonds present in the polymers making up the gel network structure. The syneresis mechanism results in the expulsion of water from the gel. This water expulsion from the gel does therefore not enable sealing and/or consolidation of the subterranean formation in a stable manner over time.

SUMMARY OF THE INVENTION

It is the object of the present invention to seal and/or to consolidate a subterranean formation and/or to plug a well, in depth, without polluting the subterranean formation, and in a stable manner over time (with a limited syneresis mechanism). The present invention therefore relates to a method for sealing and/or consolidating a subterranean formation, wherein a gelling aqueous solution comprising an alkaline solution of potassium silicate, acetic acid and an aluminate is prepared and injected into the subterranean formation. The gelling aqueous solution makes it possible to seal and/or to consolidate the subterranean formation and/or to plug a well extending into the subterranean formation. The aluminate present in the gelling aqueous solution allows to limit the syneresis mechanism so as to limit water expulsion from the gel, which promotes sealing and/or consolidation of the subterranean formation in a stable manner over time and/or plugging of the well.

The invention relates to a method of treating a subterranean formation, said subterranean formation being traversed by at least one injection well. For this method, the following steps are carried out:
 a) preparing a gelling aqueous solution comprising an alkaline solution of potassium silicate, acetic acid and an aluminate, and
 b) injecting from said injection well, into said subterranean formation, said gelling aqueous solution to seal and/or to consolidate said subterranean formation.

According to an embodiment, said aluminate is selected from among sodium aluminate in powder form and potassium aluminate in powder form.

According to an aspect, said gelling aqueous solution is prepared based on characteristics of said subterranean formation, such as porosity, permeability, surrounding temperature and/or surrounding pH value.

Advantageously, a gelling aqueous solution with a viscosity between 1 and 10 cP is prepared.

According to an implementation, a gelling aqueous solution having a setting time of between 3 and 20 hours is prepared.

According to an option, said acetic acid has a concentration of between 0.1 and 5 mol/L, preferably between 0.5 and 2 mol/L.

According to an implementation, said alkaline solution of potassium silicate has a concentration of silicon Si of between 0.5 and 7 mol/L, preferably between 0.5 and 3 mol/L.

Advantageously, said alkaline solution of potassium silicate has a molar ratio of silicon dioxide $SiO_2$ to potassium oxide $K_2O$ of between 0.5 and 10, preferably between 1 and 5.

According to an implementation, said gelling aqueous solution comprises between 1 and 30 mass % of acetic acid, preferably between 5 and 30%.

Advantageously, the gelling aqueous solution can comprise between 0.1 and 1 mass % of aluminate, preferably between 0.3 and 0.8%, more preferably between 0.4 and 0.6%, substantially 0.5 mass % of aluminate.

According to a feature, a washing fluid is injected from said injection well into said subterranean formation prior to injecting said gelling aqueous solution.

According to an embodiment, said subterranean formation treatment is sealing of said subterranean formation and/or consolidation of said subterranean formation and/or plugging of a well of said subterranean formation.

According to an embodiment, said well is a storage well, in particular for storing acid gas in said subterranean formation.

According to an aspect, said acid gas is stored prior to the step of injecting said gelling aqueous solution.

Advantageously, said subterranean formation has a surrounding pH value below 9.

BRIEF DESCRIPTION OF THE FIGURES

Other features and advantages of the method according to the invention will be clear from reading the description hereafter of embodiments given by way of non-limitative example, with reference to the accompanying figures wherein:

FIG. 1 illustrates various configurations of the aluminium substitution in the silica gel formed within the gelling aqueous solution, and FIG. 2 illustrates a comparative curve of the water fraction contained in the gel used for a method according to the prior art and for the method according to the invention.

DETAILED DESCRIPTION OF THE INVENTION

The principle of the invention is based on the introduction in a subterranean formation of a solution allowing to significantly limit the permeability of the reservoir rock and/or to consolidate it and/or to plug a well. Thus, the injected solution notably allows to limit or even to prevent fluid leakage and/or to improve the mechanical properties of the subterranean formation. A subterranean formation is understood to be the soil and the subsoil, and the depth of the subterranean formation can range between a few meters (for soil consolidation applications beneath buildings or houses for example) and a few kilometers (for oil well or gas storage applications for example).

The present invention therefore relates to a method for treating a subterranean formation, the subterranean formation being traversed by at least one injection well or injector (the injection well or the injector can be at a depth of between a few meters and a few kilometers, the depth can notably depend on the application of the subterranean formation treatment method), for which the following steps are carried out:
  preparing on the surface a gelling aqueous solution comprising an alkaline solution of potassium silicate, acetic acid and an aluminate,
  injecting, from the injection well or the injector, into the subterranean formation, the gelling aqueous solution in order to seal and/or to consolidate the subterranean formation.

Treatment of the subterranean formation can notably consist in sealing the subterranean formation and/or in consolidating the subterranean formation and/or in plugging a well of the subterranean formation.

The method according to the invention can comprise several successive steps, for example two, of injecting the gelling aqueous solution. Preferably, the method according to the invention can comprise a single injection.

Such a gelling aqueous solution is stable and unalterable, notably when the surrounding pH value (of the subterranean formation) is below 9. The method according to the invention can therefore preferably be implemented for a subterranean formation having a pH value below 9, which is generally the case.

The term "gelling" indicates that the aqueous solution is formulated in form of a non-gelled low-viscosity liquid that gels in situ, in other words, whose gelation is completed once injected into the subsurface formation (the pH value and shear in the subterranean formation promote gelation of the gelling aqueous solution). The composition of the gelling aqueous solution is thus selected so as to form a gel, from a sufficiently long time to enable the liquid to be transported from the surface to the subterranean formation. Thus, as a result of its gelling property, the aqueous solution can fulfill its role by limiting the subterranean formation permeability and porosity.

The gelling aqueous solution prepared in the method according to the invention is a mineral (inorganic) solution. In addition, the gelling aqueous solution comprises no solid particles and no salt other than the aluminate and the silicate.

An alkaline solution is a basic solution with a pH value greater than 7.

It is reminded that silica is highly soluble in alkaline solutions, notably in alkaline solutions with a pH value of about 10 and greater than 10. Furthermore, a pH decrease causes precipitation of the silica contained in the alkaline solution: from a liquid phase wherein the silica is in ionic form, oligomers form and condense so as to form a gel. The gel tends to attach to mineral surfaces by forming chemical bonds. Thus, in a porous subterranean formation, injection of such substances allows to considerably reduce the permeability and the porosity, or even to completely plug the pore network after precipitation. Besides, the minerals precipitated by the gelling aqueous solution also form a protective layer for the well equipment against the stored acid gas.

There are different forms of silicates: sodium, potassium, lithium, etc. Potassium K silicate is a water-soluble silicate of general formula $K_2O_5Si_2$. This silicate has the advantage of making the alkaline solution less viscous than sodium Na silicate notably. Thus, potassium silicate requires less dilution, which simplifies the preparation of the gelling aqueous solution. In addition, given that alkaline silicate solutions contain no particles, there is practically no injectivity limit relative to the pore size of the porous medium in the subterranean formation. In particular, injecting such a solution into compact media with nanometric pore thresholds can be envisaged, thus improving their barrier capacity even further. Besides, the alkaline solution of potassium silicate has the advantage of being inexpensive, of the order of several hundred Euros per ton. For example, the potassium silicate can be selected from among the commercial products Betol K 35 T™, Betol K 48 T™, Betol K 54 T™ or Betol K 28 T™ sold by Woellner (Germany). By way of non-limitative example, the composition of the potassium silicates Betol K 35 T™ and Betol K 28 T™ is described in Table 1. In this table, the specific gravity, unitless, is the ratio of the density of these materials to the density of water.

TABLE 1

| Product | $SiO_2$ % | $K_2O$ % | $SiO_2/K_2O$ | Viscosity (cP) | Specific gravity | pH value |
|---|---|---|---|---|---|---|
| Betol K 35 T ™ | 23.9 | 10.9 | 3.43 | 55 | 1.32 | 11 |
| Betol K 28 T ™ | 20.5 | 8.2 | 3.92 | 28 | 1.25 | 10.8 |

Acetic acid, also referred to as ethanoic acid, is a simple carboxylic acid with a theoretical $C_2$ carbon chain, similar to ethane, with a molar mass of 60 g/mol and an empirical or a molecular chemical formula $C_2H_4O_2$ or $CH_3COOH$ respectively. Vinegar is an example of an acetic acid solution: it can be a mixture of water and acetic acid. Acetic acid has the advantage, unlike other acids, of being non-polluting and it is not dangerous, whether during its preparation or when injected into the subterranean formation.

An aluminate is a compound containing an oxyanion of aluminium. Addition of an aluminate does not significantly modify the viscosity of the gelling aqueous solution. In addition, aluminates have no environmental effect. Aluminium is preferably used in aluminate form due to its solubility in the aqueous solution (for example, pure aluminium is not soluble and would therefore not be suitable for the method according to the invention). Adding aluminium to the gelling aqueous solution generates a reaction through which an aluminium atom substitutes for a silicon atom in the silica lattice formed within the specific composition. The location of this substitution notably depends on the pH conditions and on the aluminium ion concentration. FIG. 1 schematically illustrates, by way of non-limitative example, various configurations of the aluminium substitution in the silica lattice. The figure termed "pure silica slab" corresponds to the silica lattice prior to substitution (in the absence of aluminium). The figures termed "type (i)" to "type (iv)" correspond to the various configurations. The most effective configuration for limiting the syneresis mechanism is the "type (iv)" configuration, given that aluminium replaces the silica at the centre of the tetrahedron since it changes the length of all the chemical bonds, which allows the expulsion of water from the gel to be limited.

According to an embodiment of the invention, the aluminate can be a sodium aluminate (of formula $NaAlO_2$) or a potassium aluminate (of formula $KAlO_2$). Indeed, these aluminates are soluble in the aqueous solution. Furthermore, the ionic potential of sodium and potassium is low, therefore these atoms attract less the anions to form minerals and precipitate, which allows to form a gelling aqueous solution without precipitate. Preferably, the method according to the invention can use sodium aluminate. Indeed, this aluminate makes it possible to increase the sealing over time of the subterranean formation.

In addition, preferably, the aluminate is added in powder form to the gelling aqueous solution, for example a sodium aluminate powder or a potassium aluminate powder.

According to an implementation of the invention, the gelling aqueous solution is prepared at ambient temperature, and the products (water or powder for example) are preferably added little by little to the silicate solution. Thus, the step of preparing the gelling aqueous solution can be carried out by adding the aluminate to the alkaline silicate dilution water, prior to adding the acetic acid. In other words, the preparation can be carried out as follows: the aluminate is mixed with water, the potassium silicate is diluted with this water, then the acetic acid is added while taking account of temperature.

According to an embodiment of the invention, the composition of the gelling aqueous solution is essentially determined depending on the temperature of the subterranean formation. For example, during the preparation, the proportions of water and acid can be modified so as to adapt the gel time while keeping a low viscosity. Indeed, the usual main constraints for the injection of solutions into a subterranean formation are:
- moderate viscosity, so that the injection pressures are well below the breakdown pressures of the formation, advantageously, the viscosity of the gelling aqueous solution can range between 1 and 10 cP, and
- sufficient setting time, also referred to as gel time (i.e. the time required between the preparation of the solution and its gelation), to enable injection of the solution when it is prepared on the surface, then injected into the formation, advantageously, the gel time can range between 3 and 20 hours.

According to an implementation of the invention, the acetic acid can have a concentration of between 0.1 and 5 mol/L, preferably between 0.5 and 2 mol/L in the solution used for the preparation. This concentration range notably allows to prepare the gelling solution without risk of generating aggregates and an inhomogeneous solution. For example, the acetic acid can have a concentration substantially equal to 1 mol/L. i.e. a concentration substantially identical to that of a vinegar. It is the pure acid concentration in the gelling solution that allows the gel time to be adjusted. Thus, the initial silicate solution can be diluted with a larger amount of water if a more concentrated acid is used.

According to an embodiment of the invention, the alkaline solution of potassium silicate can have a silicon Si concentration of between 0.5 and 7 mol/L, preferably between 0.5 and 3 mol/L. This concentration range notably allows stable irreversible gels to be obtained. For example, the commercial alkaline solution of potassium silicate can have a silicon concentration of between 4 and 5 mol/L, substantially equal to 4.7 mol/L. It can then be diluted with water to reach a concentration of between 0.5 and 3 mol/L, for example substantially equal to 1.8 mol/L. This dilution also reduces the viscosity of the solution to values close to that of pure water.

According to a feature of the invention, the alkaline solution of potassium silicate can have a molar ratio ($SiO_2/K_2O$) of silicon dioxide $SiO_2$ to potassium oxide $K_2O$ ranging between 0.5 and 10, preferably between 1 and 5. For example, the alkaline solution of potassium silicate can have a molar ratio of silicon dioxide $SiO_2$ to potassium oxide $K_2O$ substantially equal to 4.

According to a variant embodiment of the invention, the gelling aqueous solution can comprise between 1 and 30 mass % of acetic acid, preferably between 10 and 20 mass % of acetic acid relative to the total mass of gelling aqueous solution. It is thus possible to adjust the pH value of the gelling aqueous solution. For example, the gelling aqueous solution can substantially contain 16 mass % of acetic acid.

According to an aspect of the invention, the gelling aqueous solution can comprise between 0.1 and 1 mass % of aluminate, preferably substantially 0.5% relative to the total mass of gelling aqueous solution. These ranges allow to limit the syneresis mechanism within the gel without reaching a solubility limit for the aluminate in the water.

According to an embodiment of the invention, the aqueous silicate solution can be prepared with a 50/50 water and silicate dilution. Thus, for this embodiment, the silicon Si concentration can range between 0.25 and 3.5 mol/L, preferably between 0.25 and 1.5 mol/L in the gelling aqueous solution.

According to a non-limitative embodiment example, the gelling aqueous solution can be prepared from:
- 12.3 mass % of 2 mol/L acetic acid,
- 43.6 mass % of potassium silicate solution,
- 0.5 mass % of sodium aluminate,
- 43.6 mass % of water.

For this example, this gelling aqueous solution comprises:
- 85.5 mass % of water (from the gelling aqueous solution),
- 8.9 mass % of silica,
- 3.6 mass % of potassium,
- 1.5 mass % of acetic acid,
- 0.5 mass % of sodium aluminate.

This preferred embodiment provides a compromise between the gel time, the viscosity and the syneresis mechanism limitation, the composition being adjusted according to the subterranean formation parameters (notably a temperature of 15° C., etc.). However, the gelling aqueous solution that needs to be adapted to the subterranean formation can comprise other compositions.

When useful, in particular when the temperature of the target formation is high, the gel time can be further increased using another weak acid such as boric acid. The gelling aqueous solution can comprise any other compound notably allowing adaptation thereof to the subterranean formation.

Plugging a porous formation around a well can be achieved as follows:
preparing, on the surface, a gelling aqueous solution from an alkaline solution of potassium silicate, water, acetic acid and an aluminate. Preferably, these mixtures are prepared gradually so as to avoid local precipitation due to an excessive local concentration. Such gradual mixing devices are commonly available, for example for preparing gels from polymers. At surface temperatures below the temperature expected in the subterranean formation (for example 20° C. relative to 40° C.), the gelation kinetics is greatly reduced, which increases the time available for preparing the mixtures even more, and more preferably, the preparation can be implemented as follows: mixing the aluminate and the water, diluting the potassium silicate with this water, then adding the acetic acid while taking account of the temperature. For example, for a temperature of 15° C., 2M acetic acid can be used, and for a temperature of 40° C., 1M acetic acid can be used,
injecting the gelling mixture (the gelling aqueous solution) into the formation, in particular using conventional pumping means; upstream from the injected volume (fluid contained in the well), water can be used without causing precipitation. Downstream from the injected volume, water can be similarly used.

An order of magnitude for the gel time of the gelling aqueous solution at 40° C. can be approximately 500 min, i.e. 8.5 h. This order of magnitude is sufficient to allow the gelling aqueous solution to be placed in the porous formation prior to gelation. For example, for a pore volume of about 10 m$^3$ in a 1-m radius around a well and over a height of 10 m with a 30% porosity-using a typical pumping rate of 10 m$^3$/h-, the required injection time for the gelling aqueous solution is 1 hour. To this must be added the travel time of the solution in the well, which can be about 3 hours depending on the technique used and on the injection tube diameter. For example, for the cement in a well, several litres of the gelling aqueous solution can be used.

In order to wash the subterranean formation, the method can comprise a step of injecting a buffer fluid, notably fresh water, prior to injecting the gelling aqueous solution. In addition, the washing fluid can contain viscosifier additives to improve washing.

In the case of an acid gas storage well, the volume of washing fluid injected is preferably sufficient for pushing the acid gas radially back at least a few meters from the vicinity of the well. This flushing, preferably using water, provides thereafter good injectivity of the gelling aqueous solution comprising the reactive material in the vicinity of the well. In the absence of flushing, the method could be less effective because there is a risk of rapid formation of superficial mineral compounds (carbonates and/or sulfides) locally causing clogging of the pores that would limit the invasion of the vicinity of the well by the reactive formulation.

The method can further comprise a step of plugging the well after injecting the gelling aqueous solution.

For example, the operation can be completed by injecting a cement plug, or any other plugging formulation, so as to hold the reactive material in place. Once this first operation completed, the same operation can be performed in other zones, in particular at the reservoir top after casing perforation and primary cementing so as to enable injection.

The method according to the invention can be applied to an acid gas storage well in the subterranean formation. It can also be applied to an exploitation or exploration well of a subterranean formation comprising hydrocarbons. It can also be applied to a well used for oil recovery by fracturing, in particular by hydraulic fracturing. In this case, the gelling aqueous solution allows plugging of the perforation and/or of the fractures formed during the process. Alternatively, it can be applied to any type of storage in a subterranean formation, for example for radioactive material storage. For all these applications, the method according to the invention notably allows to limit gas leakage through the well, through sealing and/or consolidation of the subterranean formation.

The invention can also apply for closing an injector that is to be no longer used, which may be likened to abandonment of an oil well. However, the invention can also be implemented during the construction of a well specifically drilled for geological storage of acid gas, whether in reservoir rocks, aquifers or coal veins.

The invention also applies to the consolidation of clay soils on which houses or any types of building are constructed, and to the consolidation of sand soils with low mechanical strength. For this application, the method according to the invention is particularly advantageous for houses and buildings where the behaviour of the clay soil has generated degradations. In this context, the method can comprise the following steps:
drilling at least one well or an injector beneath the house or the building, for example at a depth of a few meters beneath the house or the building,
preparing, on the surface, a gelling aqueous solution from an alkaline solution of potassium silicate, water, acetic acid and an aluminate. Preferably, these mixtures are prepared gradually so as to avoid local precipitation due to an excessive local concentration. Such gradual mixing devices are commonly available, for example for preparing gels from polymers. At surface temperatures below the temperature expected in the subterranean formation (for example 20° C. relative to 40° C.), the gelation kinetics is greatly reduced, which increases the time available for preparing the mixtures even more, and more preferably, the preparation can be implemented as follows: mixing the aluminate and the water, diluting the potassium silicate with this water, then adding the acetic acid while taking account of the temperature. For example, for a temperature of 15° C. 2M acetic acid can be used, and for a temperature of 40° C., 1M acetic acid can be used, injecting the gelling mixture (the gelling aqueous solution) into the well or the injector, in particular using conventional pumping means; upstream from the injected volume (fluid contained in the well), water can be used without causing precipitation. Downstream from the injected volume, water can be similarly used.

EXAMPLE

The features and advantages of the method according to the invention will be clear from reading the comparative example hereafter.

For this example, we compare the syneresis mechanism implemented for a gel formed by means of the method according to the prior art described in patent application FR-3,049,642 (WO-2017/174,243), i.e. without aluminate, with the syneresis mechanism for a gel formed by means of the method according to the invention, i.e. with an aluminate.

The gelling aqueous solution of the method according to the prior art is prepared at ambient temperature with an alkaline silicate (Betol K 28™), fresh water and 2 mol/L acetic acid.

The gelling aqueous solution of the method according to the invention is prepared with addition of sodium aluminate. It can be noted that, with the amounts used, the proportion of silicon substituted with aluminium is maximum 10% in the gel thus formed. The gelling aqueous solution thus formed comprises 43.6 mass % of water, 43.6 mass % of silicate, 12.3 mass % of acetic acid and 0.5 mass % of sodium aluminate.

For this comparative example, both gels are generated in test tubes. Indeed, in a test tube, it is possible to distinguish the water in and outside (supernatant) the gel, thus allowing the kinetics of the mechanism to be evaluated. This measurement of the water is achieved by magnetic resonance, using the measurement of the transverse relaxation times T2 allowing to distinguish the water in and outside the gel.

Monitoring of the water in and outside the gel was performed at high temperature (60° C.) in order to accelerate these transformations that may last several weeks at lower temperature. FIG. 2 is a graph of the water fraction Fw in the gel (dimensionless, value 1 corresponding to the initial state upon formation of the gel) as a function of time T in h. In this figure, curve AA corresponds to the gel formed by the method according to the prior art, and curve INV corresponds to the gel formed by the method according to the invention. This, this graph clearly shows the effect of adding sodium aluminate (INV) to the amount of water in the gel as a function of time. It is noted that, for this example, the amount of aluminate added is practically the limit of its solubility in water. Time t=0 corresponds to the formation of gel at low temperature (15° C.). The temperature is then raised to 60° C. At t=100 h, the amount of water in the gel for the method according to the invention is stabilized (because substantially constant between 100 h and 900 h) and much larger than in the absence of aluminate according to the prior art (a water fraction in the gel of about 0.65 for the method according to the invention in relation to a water fraction of about 0.3 for the method according to the prior art). Therefore, the method according to the invention allows to limit the syneresis mechanism of the gel formed in the subterranean formation, which guarantees good sealing and good consolidation of the subterranean formation.

The invention claimed is:

1. A method of treating a subterranean formation, said subterranean formation being traversed by at least one injection well, characterized in that the following steps are carried out:
   a. preparing a gelling aqueous solution comprising an alkaline solution of potassium silicate, acetic acid and an aluminate, and
   b. injecting from said injection well, into said subterranean formation, said gelling aqueous solution to seal and/or to consolidate said subterranean formation.

2. The method as claimed in claim 1, wherein said aluminate is selected from among sodium aluminate in powder form and potassium aluminate in powder form.

3. The method as claimed in claim 1, wherein said gelling aqueous solution is prepared based on characteristics of said subterranean formation.

4. The method as claimed in claim 1, wherein a gelling aqueous solution with a viscosity of between 1 and 10 cP is prepared.

5. The method as claimed in claim 1, wherein a gelling aqueous solution having a setting time of between 3 and 20 hours is prepared.

6. The method as claimed in claim 1, wherein said acetic acid has a concentration of between 0.1 and 5 mol/L.

7. The method as claimed in claim 1, wherein said alkaline solution of potassium silicate has a concentration of silicon Si of between 0.5 and 7 mol/L.

8. The method as claimed in claim 1, wherein said alkaline solution of potassium silicate has a molar ratio of silicon dioxide $SiO_2$ to potassium oxide $K_2O$ of between 0.5 and 10.

9. The method as claimed in claim 1, wherein said gelling aqueous solution comprises between 1 and 30 mass % of acetic acid.

10. The method as claimed in claim 1, wherein the gelling aqueous solution can comprise between 0.1 and 1 mass % of aluminate.

11. The method as claimed in claim 1, wherein a washing fluid is injected from said injection well into said subterranean formation prior to injecting said gelling aqueous solution.

12. The method as claimed in claim 1, wherein said subterranean formation treatment is sealing of said subterranean formation and/or consolidation of said subterranean formation and/or plugging of a well of said subterranean formation.

13. The method as claimed in claim 1, wherein said well is a storage well for storing acid gas in said subterranean formation.

14. The method as claimed in claim 13, wherein said acid gas is stored prior to the step of injecting said gelling aqueous solution.

15. The method as claimed in claim 12, wherein said subterranean formation treatment is a consolidation of a clay soil on which a house or a building is constructed.

16. The method as claimed in claim 1, wherein said gelling aqueous solution is prepared based on porosity, permeability, surrounding temperature and/or surrounding pH value of said subterranean formation.

17. The method as claimed in claim 1, wherein said acetic acid has a concentration of between 0.5 and 2 mol/L and said alkaline solution of potassium silicate has a concentration of silicon Si of between 0.5 and 3 mol/L.

18. The method as claimed in claim 1, wherein said alkaline solution of potassium silicate has a molar ratio of silicon dioxide $SiO_2$ to potassium oxide $K_2O$ of between 1 and 5.

19. The method as claimed in claim 1, wherein said gelling aqueous solution comprises between 5 and 30% of acetic acid.

20. The method as claimed in claim 1, wherein the gelling aqueous solution can comprise between 0.3 and 0.8% of aluminate.

\* \* \* \* \*